Feb. 20, 1968  D. E. McCARTHY  3,369,446
REFLECTANCE ACCESSORY

Filed Dec. 16, 1963  3 Sheets-Sheet 1

INVENTOR.
DONALD E. McCARTHY
BY
*Paul R. Harder*
ATTORNEY

Feb. 20, 1968     D. E. McCARTHY     3,369,446
REFLECTANCE ACCESSORY

Filed Dec. 16, 1963     3 Sheets-Sheet 3

INVENTOR.
DONALD E. McCARTHY
BY
*Paul R. Harder*
ATTORNEY

United States Patent Office 3,369,446
Patented Feb. 20, 1968

3,369,446
REFLECTANCE ACCESSORY
Donald Everett McCarthy, La Habra, Calif., assignor to Beckman Instruments, Inc., a corporation of California
Filed Dec. 16, 1963, Ser. No. 330,775
9 Claims. (Cl. 88—14)

ABSTRACT OF THE DISCLOSURE

A reflectance accessory for use in optical analyzers is disclosed which may be interposed in the sample compartment of such analyzers without changing the position of focus of the original source image. The reflectance accessory generally consists of a collimating device for collimating radiation from the source which is then reflected to a corner reflector, which may consist of a sample surface and a reflecting surface mounted at right angles or in the case of attenuated total reflectance work a right angle prism, mounted for rotation such that the angle of incidence of the radiation may be varied. Radiation from the sample is then refocused at the point of original focus of the source image.

Disclosure

This invention generally relates to the field of spectroscopy and more particularly relates to an accessory for use in spectrophotometers and other radiation comparison instruments for making attenuated total reflection or specular reflectance measurements of a sample as a function of incident angle of the radiation and can further be used as a reflecting polarizer.

In the past attenuated total reflectance (ATR), variable angle specular reflectance and reflecting polarization work have frequently been done utilizing converging or diverging radiation beams. In such case some rays are not attenuated to the same degree as others and pass the instrument as nearby stray light thus decreasing the band intensity to produce erroneous results for quantitative determinations. By working in a parallel beam each ray is attenuated equally at each angle of incidence. Thus any change in the critical angle due to an absorption band of a sample affects each ray equally and true intensity may be measured. By collimating the converging or diverging beam, all rays coming from the same point on a finite source are parallel but are not necessarily parallel to rays emanating from a different point on the same source. A collimated beam represents the closest approach to a parallel beam when working with finite sources and slits currently utilized in conventional radiation comparison systems.

Although specular reflectance measurements have been made in a collimated beam, extensive modification of existing instruments has generally been required, particularly that of changing the position of the detector since these modifications have always changed the focus point of the source image.

It is an object of this invention to provide an accessory for spectrophotomeers and other radiation comparison systems which may be mounted in the sample or reference compartments thereof allowing attenuated total reflection and specular reflectance measurements as a function of incident angle to be made conveniently.

Another object is provision of an accessory for making attenuated total reflectance and specular reflectance measurements as a function of incident angle and which may be positioned between a radiation source and a detector without changing the position of focus of the source image.

Another object is to provide an accessory which may be conveniently utilized in attenuated total reflectance and specular reflectance measurements wherein the incident angle may be readily varied.

Still a further object is provision of an accessory for use in attenuated total reflectance and specular reflectance work and which may additionally be utilized as a reflecting polarizer.

Other objects and novel combinations and arrangements of parts of this invention will become better understood by reference to the following detailed description of an exemplary preferred embodiment of the invention when considered in connection with the accompanying drawings in which like reference numerals designate like parts throughout the several figures thereof and wherein.

Figure 1:
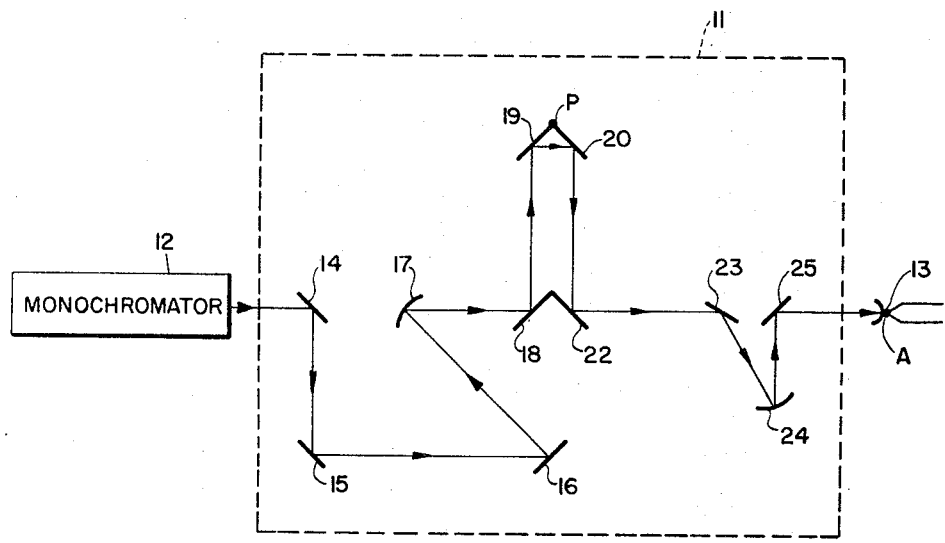
FIG. 1 illustrates an optical diagram of an accessory constructed after the teachings of the present invention.

Referring now to FIG. 1 the accessory 11 is interposed between a radiation source 12 and a detector 13. It is apparent that the radiation source 12 may be any suitable source of radiation such as the exit slit of a monochromator. Further, it is apparent that the point A, representing the point of original focus of the source image need not be at detector 13 but may be the entrance slit of the monochromator, in which case the detector would be located after the exit slit of the monochromator wherein only radiation of the desired wavelength, after dispersion by the monochromator, would be focused on the detector by other means.

Radiation from source 12 is intercepted by fixed mirror 14 and directed by fixed mirrors 15 and 16 to a collimating device, such, for example, as concave mirror 17. Collimated radiation from the collimating device is directed by fixed mirror 18 to a first surface 19. Surface 19 is mounted at a right angle to surface 20 to form a corner reflector rotatable about point P without changing the orientation of sufaces 19 and 20. Radiation from surface 19 is reflected by surface 20 to fixed mirror 22 and directed by fixed mirror 23 to a refocusing device, such, for example, as concave mirror 24. Refocusing device 24 serves to focus the source image at the original point of focus A through fixed mirror 25.

In specular reflectance work surface 19 may be the front surface of a sample the reflectance of which is to be measured as a function of incident angle and surface 20 may be a mirrored surface. When using the accessory as a reflecting polarizer surface 19 may be a polarizing material, such, for example, as germanium, and surface 20 a mirrored surface. In attenuated total reflectance work surfaces 19 and 20 may be replaced by a right angle prism with the sample pressed against or held contiguous to the right angle surface corresponding to surface 19.

In the arrangement indicated it is apparent that if surfaces 19 and 20 form a corner reflector such that the plane of these surfaces intersect at point P, the incident angle of the collimated radiation upon surface 19 may be changed by rotation of these surfaces about point P without changing the path along which the radiation passes from surface 20 to reflecting surface 22.

Figure 2:
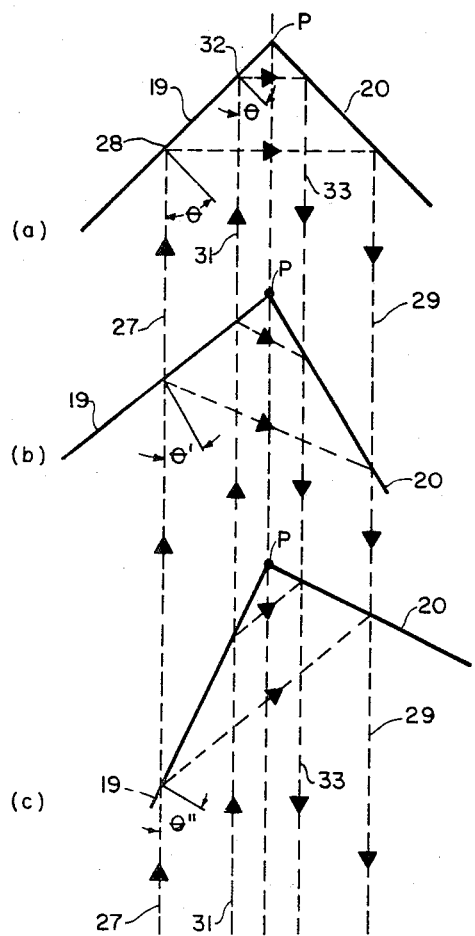
FIG. 2 is an optical diagram illustrating a feature of operation of the accessory.

Referring now to FIG. 2 there is illustrated in greater detail the corner reflector in various positions to illustrate the principles of operation of the accessory. With the corner reflector in the position illustrated in FIG. 2a, radiation ray 27 strikes surface 19 at point 28 at an incident angle $\theta$, is reflected to surface 20 and returned along path 29. Likewise radiation ray 31 strikes surface 19 at point 32, is reflected to surface 20 and returned along path 33. If radiation ray 31 emanates from the same point on the source, it is, after collimation, parallel to ray 27 and its angle of incidence is likewise $\theta$. If surfaces 19 and 20 are now rotated about point P as illustrated in FIG. 2b radiation ray 27 now strikes surface 19 at a smaller incident angle $\theta'$. Radiation from ray 27 reflected from surface 19 to surface 20 is again returned along path 29. Likewise radiation due to ray 31 striking surface 19 is returned by surface 20 along path 33. As is apparent from FIG. 2c wherein surfaces 19 and 20 have been rotated about point P such that the angle of incidence $\theta''$ is greater than the angle of incidence $\theta$ that rays 27 and 31 are again returned by surface 20 along paths 29 and 33 respectively. It is apparent to those skilled in the art that by placing a corner reflector in a collimated beam path and by rotating the reflector about the point of intersection of the plane of the surfaces that an incident ray will always be returned along a coincident path for all angles of incidence. It is apparent that either surfaces 19 or 20 may comprise the sample surface and that the other may comprise a reflecting surface such as a mirror without affecting the principles of operation of the invention.

Figure 3:
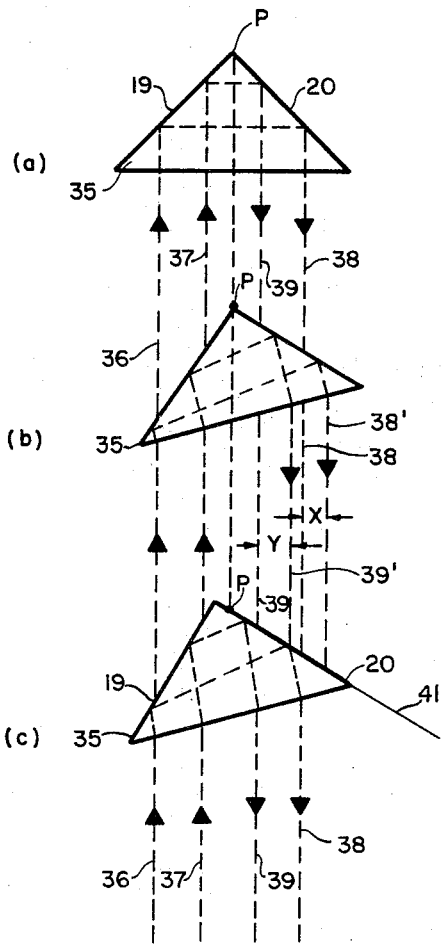
FIG. 3 is another optical digaram illustrating a second feature of operation of the accessory.

Referring now to FIG. 3 there is illustrated the principles of operation of the accessory for attenuated total reflectance work utilizing a right angle prism 35 whose right angle surfaces now correspond to surfaces 19 and 20 of the corner reflector when the prism is rotated about point P. As is well known, when the external surface of the prism is contiguous with a medium having an index of refraction smaller than that of the prism total internal reflectance takes place within the prism if the incident angle of the ray striking the boundary surface is greater than the critical angle. As is also well known, the index refraction of a material changes at each absorption band of the material. By placing a sample contiguous to surface 19 of prism 35 and positioning the prism at or near the critical angle absorption bands of the material may be determined by scanning reflected radiation since at each absorption band the critical angle changes and a portion of the incident radiation enters the sample and is absorbed. Thus, total internal reflection no longer occurs at the boundary surface and the reflected intensity not only indicates where the absorption band occurs but also a measure of the absorbance of the material.

Referring now to FIG. 3a, radiation rays 36 and 37 enter prism 35, are reflected from surfaces 19 and 20 and issue from the prism along paths 38 and 39 respectively. When prism 35 is rotated about point P as illustrated in FIG. 3b rays 36 and 37 issue from the prism along paths 38′ and 39′ and, although parallel to the original radiation issuing therefrom are displaced from paths 38 and 39 by distances $x$ and $y$ respectively. This displacement is due to the increased path length of the radiation through prism 35 having a higher index of refraction from the surrounding medium. This displacement may be corrected by moving prism 35 along the plane of surface 20 without changing the point of rotation P. Thus, as illustrated in FIG. 3c, by moving prism 35 parallel to the plane of surface 20 as represented by line 41 in the direction indicated by the arrow radiation due to rays 36 and 37 is made to issue along paths 38 and 39 coincident with the original radiation paths. It is apparent that by this repositioning of prism 35 the optical path length through the prism has been made to equal the path length for each of these rays in FIG. 3a. It is apparent that each ray striking the prism may be returned along the same path for all angles of incidence of the ray upon surface 19 by appropriate positioning of prism 35 in the plane 41.

Figure 4:
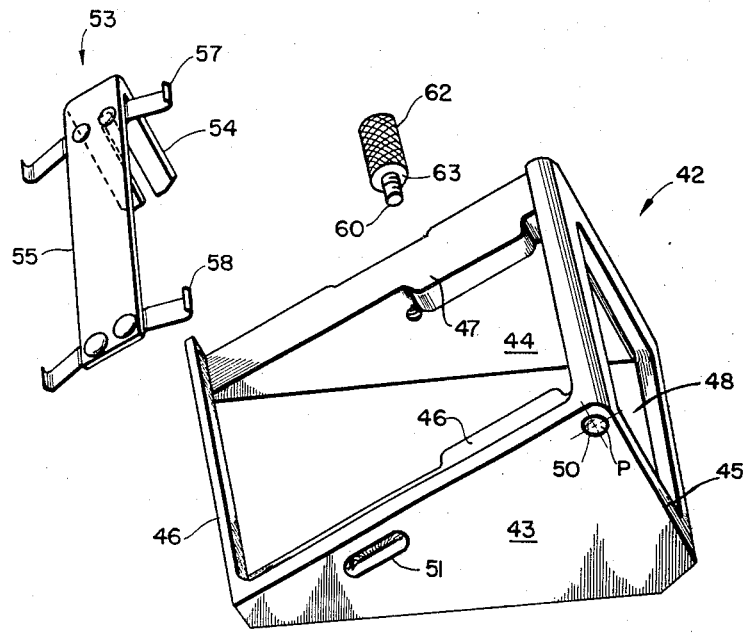
FIG. 4 illustrates an exemplary preferred embodiment of a holder for a sample material or a polarizing material to form with a second surface a corner reflector.

Referring now to FIG. 4 there is illustrated a portion of the accessory which comprises a holder 42 for the sample and the second reflecting surface to form the corner reflector for specular reflectance and reflecting polarization work. The holder comprises a bottom portion 43, a top portion 44, a first rear portion 45 and a supporting section 46. The holder may be of unitary cast construction and bottom portion 43 and top portion 44 are formed with shoulder portions 46 and 47 respectively which together with the edges of bottom and top portions 43 and 44 form a surface against which the sample or polarizing material may be supported. Rear portion 45 has an aperture 48 therein adapted to receive a reflecting surface such as a flat mirror. A cone-shaped recess 50 and an elongated slot 51 having an internal triangular shape are formed in the outer surface of bottom portion 43.

A spring clip generally indicated by the reference numeral 53 is of elongated right angle shape having a bifurcated upper portion 54 and an elongated lower extending portion 55. The lower extending portion 55 has a pair of pressure springs 57 and 58 affixed thereto in any suitable manner. For specular reflectance work a front surfaced sample may be placed abutting the edges of bottom and top surfaces 43 and 44 and shoulders 46 and 47 and held in place by spring clip 53 by hooking the upper portion 54 over the upper surface of top 44 and the bifurcated portion thereof about the threaded portion 60 of screw 62 such that the shoulder 63 may be tightened against the upper portion 54 to secure clip 53 in place. Pressure springs 57 and 58 serve to press the front surface of the sample against shoulders 46 and 47. A reflecting surface may be secured within aperture 48 in a similar or any other suitable manner. The holder is arranged such that the extension of the front surface plane of the sample and of the reflecting surface intersect at the center of conical shaped recess 50 which forms the point of rotation of the holder.

Figure 5:
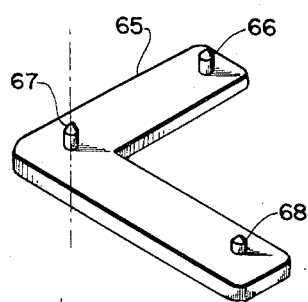
FIG. 5 illustrates a support for the holder of FIG. 4.

Referring now to FIG. 5 there is illustrated a support member for the holder of FIG. 4. Support member 65 is L-shaped and has projecting portions 66, 67 and 68. Projection 67 is located at the center of rotation of the support member. Projecting portions 66 and 67 are slightly larger than the projecting portion 68. In practice the holder of FIG. 4 may be placed upon the support member 65 such that projecting portion 67 projects into conical recess 50, it being obvious that if the upper portion of projection 67 is spherical, the holder will always be supported at precisely the same place each time it is placed upon support member 65. Projecting portion 66 rests within the elongated shaped triangular slot 51. The outer surface of bottom portion 43 rests upon projection 68. It is obvious that the holder 42 may readily be positioned upon support member 65 and that by such an arrangement as illustrated, the intersection of the planes of the sample surface and of the reflecting surface will always coincide with the center of rotation of the corner reflector.

Figure 6:
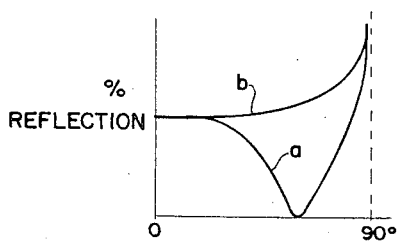
FIG. 6 illustrates a typical reflection versus angle of incidence curve for a polarization material.

For reflecting polarization work a suitable polarizing material may be secured within the holder in like manner. Referring to FIG. 6 there is illustrated respectively by curves $a$ and $b$ the parallel component and the perpendicular component of reflected polarized light from a germanium surface as a function of incident angle. As illustrated, at an incident angle of approximately 76° the percent reflection of the parallel component from the germanium surface is substantially zero and the reflection of the perpendicular component at the same angle is approximately 80%. The advantage of reflecting polarizers is that they generally are not wavelength dependent and germanium may be utilized over approximately the range of 2 to 200 microns with approximately 40% reflection of the incident light and 99% polarization. Transmitting polarizers on the other hand generally transmit only about 40% of the incident light at approximately 98–99% polarization but are wavelength limited.

Figure 7:
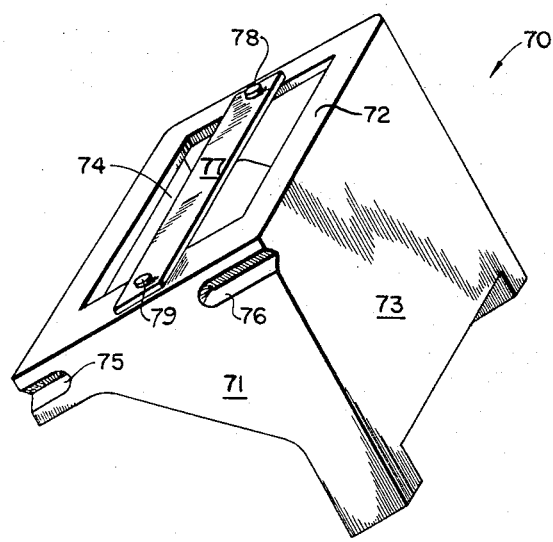
FIG. 7 illustrates a holder for a prism when using the accessory for attenuated total reflectance work.

Referring now to FIG. 7 there is illustrated a holder for use with the rotatable support of FIG. 5 in attenuated total reflectance work. Holder 70 is adapted to receive a right angle prism. The holder 70 has a bottom member 71 and two upstanding side members 72 and 73 formed at right angles. Side member 72 has an aperture 74 therein. Elongated slots 75 and 76 of triangular or wedge internal configuration are formed in the lower surface of bottom portion 71 and receive the projections 66 and 67 of support 65 (FIG. 5) such that the plane of the inner surfaces of side walls 72 and 73 pass through the point of rotation of support 65. By elongation of slots 75 and 76 the prism may be positioned as indicated in FIG. 3 such that all rays entering the prism are reflected out of the prism along coincident paths for all angles of incidence.

Aperture 74 is provided in side wall 72 to allow a sample to be pressed aaginst the adjacent outer surface of the prism. The sample may be secured against the surface of the prism by a removable strip 77 secured to the holder 70 by bolts 78 and 79. The prism may be secured within the holder 70 in any suitable manner not shown. It is apparent that by sealing the prism to the front surface of side member 72 and a plate or other suitable receptacle to the rear surface of side wall 72, the void formed by the prism surface and the plate or receptacle may be utilized for attenuated total reflectance work of fluid samples. By rotation and positioning of the holder and consequently of the prism, attenuated total reflectance measurements may be performed as previously described.

In using either of holders 42 or 70 for analysis of thin films, it is apparent that the sample may be secured to the surface of any suitable supporting material prior to placement in the holder. For example, in many instances, it is desired to determine the specular reflectance characteristics of various paints. In such case, the sample may be painted upon a piece of glass or any other suitable material for support.

There has been illustrated and described an accessory for radiation comparison apparatus such as spectrophotometers which may be inserted between the radiation source and the detector without changing the point of focus of the original slit image and which provides a simple and readily variable means for changing the incident angle of collimated radiation upon the sample surface. The accessory may readily be utilized, following the teachings of this invention, in specular reflectance, attenuated total reflectance and reflecting polarization work. By proper arrangement of the optics the beam may be collimated and refocused at the point of the original source image yet the accessory may be made small enough to be inserted into the sample compartment of the spectrophotometer or other instrument and requires no other modification of the instrument.

Although the invention has been particularly described in connection with the exemplary embodiment thereof illustrated it should be understood that various changes, modifications and substitutions, other than those hereinbefore mentioned, may be made without departing from the spirit of the invention and the scope of the appended claims.

What is claimed is:

1. An attachment accessory for insertion into the sample compartment of an instrument having a source of radiation and means for producing a source image at a given point comprising:
   means collimating radiation from said source;
   means for mounting a first surface in said collimated radiation, said means being movable so as to change the angle of incidence of said collimated radiation on said surface;
   means positioned to receive radiation from said first surface for forming a source image;
   said mounting means and at least a portion of said image forming means being mechanically coupled such that the source image is positioned at said given point at all angles of incidence.

2. An attachment for varying the incident angle of radiation upon a surface adapted to be mounted in an instrument having a source of radiation and means for producing a source image at a given point without defocusing said instrument comprising:
   means positioned to receive radiation from said source and collimate said radiation;
   means for mounting a surface in said collimated radiation, said means being movable to vary the incident angle of said collimated radiation upon said surface;
   means positioned to receive radiation from said surface and forming a source image at the original focus point of said instrument.

3. An attachment for interposition between a radiation source and a detector for varying the incident angle of the source radiation upon a surface comprising:
   means positioned to receive radiation from said source and collimating said radiation;
   means for mounting a first surface in said collimated radiation and a reflecting surface at a right angle to said first surface, said means being rotatable about the intersection of the extension of the planes of said first and reflecting surfaces;
   means positioned to receive radiation from said reflecting surface and focusing said radiation at a point.

4. An attachment for varying the incident angle of radiation upon a surface adapted to be mounted in an instrument having a source of radiation and means for producing a source image at a given point without defocusing said instrument comprising:
   means positioned to receive radiation from said source for collimating said radiation;
   means for mounting a first surface in said collimated radiation and a reflecting surface at a right angle to said first surface, said means being rotatable about the intersection of the extension of the planes of said first and reflecting surfaces;
   means positioned to receive radiation from said reflecting surface and focusing said radiation at the original focus point of said instrument.

5. An attachment apparatus for insertion into the sample compartment of a spectrophotometer having a radiation source and a detector comprising:
   means collimating the radiation from said source;
   means for mounting a first surface in said collimated radiation, said means being movable so as to change the angle of incidence of said radiation on said surface;
   means positioned to receive radiation from said first surface for refocusing said radiation to form a source image;
   said mounting means and at least a portion of said refocusing means being mechanically coupled such that the refocused source image and the original source image of said spectrophotometer are coincident for all angles of incidence.

6. An apparatus for varying the incident angle of radiation upon a surface adapted to be mounted in an instrument having a radiation source comprising:
   means for collimating radiation from said source;
   means mounting a first surface in said collimated radiation and a reflecting surface at a right angle to said first surface, said means being rotatable about the intersection of the extension of the planes of said first and reflecting surfaces, said means adapted to receive a right angle prism for mounting the right angle surfaces of said prism along said planes whereby one of said right angle surfaces constitutes said reflecting surface;
   means positioned to receive radiation from said reflecting surface and focusing said radiation at a point.

7. An apparatus for varying the incident angle of radiation upon a surface adapted to be mounted in an instrument having a radiation source and means for focusing radiation therefrom without defocusing said instrument comprising:

means for collimating radiation from said source;
means mounting a first surface in said collimated radiation and a reflecting surface at a right angle to said first surface, said means being rotatable about the intersection of the extension of the planes of said first and reflecting surfaces, said means adapted to receive a right angle prism for mounting the right angle surfaces of said prism along said planes whereby one of said right angle surfaces constitutes said reflecting surface, at least a portion of said mounting means being movable in the plane of one of said surfaces;
means positioned to receive radiation from said reflecting surface and focusing said radiation at a point.

8. An apparatus for measuring the attenuated total reflectance of a sample as a function of incident angle for interposition between a source including means for focusing radiation therefrom and a detector without disturbing the position of the original source image with respect to the detector comprising:

means positioned to receive radiation from said source and collimate said radiation;
a right angle prism;
means rotatably mounting said right angle prism in said collimated radiation for rotating said prism about an axis coincident with the intersection of the planes of said right angle surfaces, said means including means for mounting a sample adjacent one of said right angle surfaces whereby the incident angle of collimated radiation impinging upon said sample may be varied by rotation of said prism;
means positioned to receive radiation issuing from said prism and forming a source image at the point of the original source image.

9. An apparatus for measuring the attenuated total reflectance of a sample as a function of incident angle for interposition between a source including means for focusing radiation therefrom and a detector without disturbing the position of the original source image with respect to the detector comprising:

means positioned to receive radiation from said source and collimate said radiation;
a right angle prism;
means mounting said right angle prism in said collimated radiation and for rotating said prism about an axis coincident with the intersection of the planes of said right angle surfaces, said means including means for mounting a sample adjacent one of said right angle surfaces whereby the incident angle of collimated radiation impinging upon said sample may be varied by rotation of said prism, said means including means for moving said prism along the plane of one of said right angle surfaces whereby the radiation path length through said prism may be maintained constant for all incident angles;
means positioned to receive radiation from said prism to form a source image at the point of the original source image.

References Cited

UNITED STATES PATENTS

| | | | |
|---|---|---|---|
| 2,571,937 | 10/1951 | Peck | 88—14 |
| 3,026,620 | 3/1962 | Rantsch | 88—24 |
| 3,240,111 | 3/1966 | Sherman et al. | 88—14 |

OTHER REFERENCES

Delay et al.: Identification of Coatings on Paper by Attenuated Total Reflectance, Tappi, vol. 46, No. 2, February 1963.

JEWELL H. PEDERSEN, *Primary Examiner.*

B. LACOMIS, *Assistant Examiner.*